Feb. 12, 1935. J. C. CONRAD 1,990,816
COTTON HARVESTING AND CLEANING MACHINE
Filed Feb. 28, 1929 3 Sheets-Sheet 3
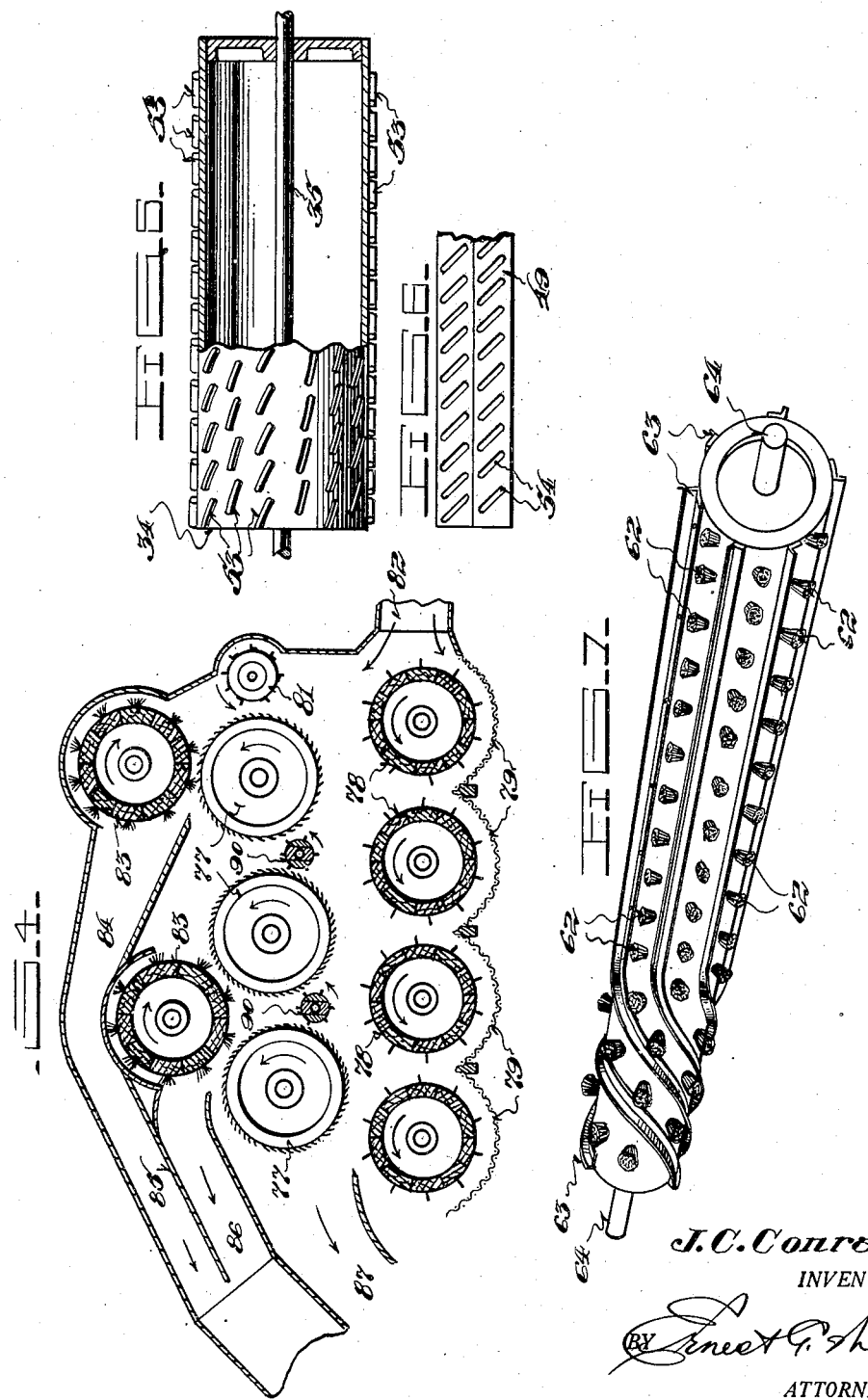
J. C. Conrad
INVENTOR.
BY Ernest G. Hood
ATTORNEYS.

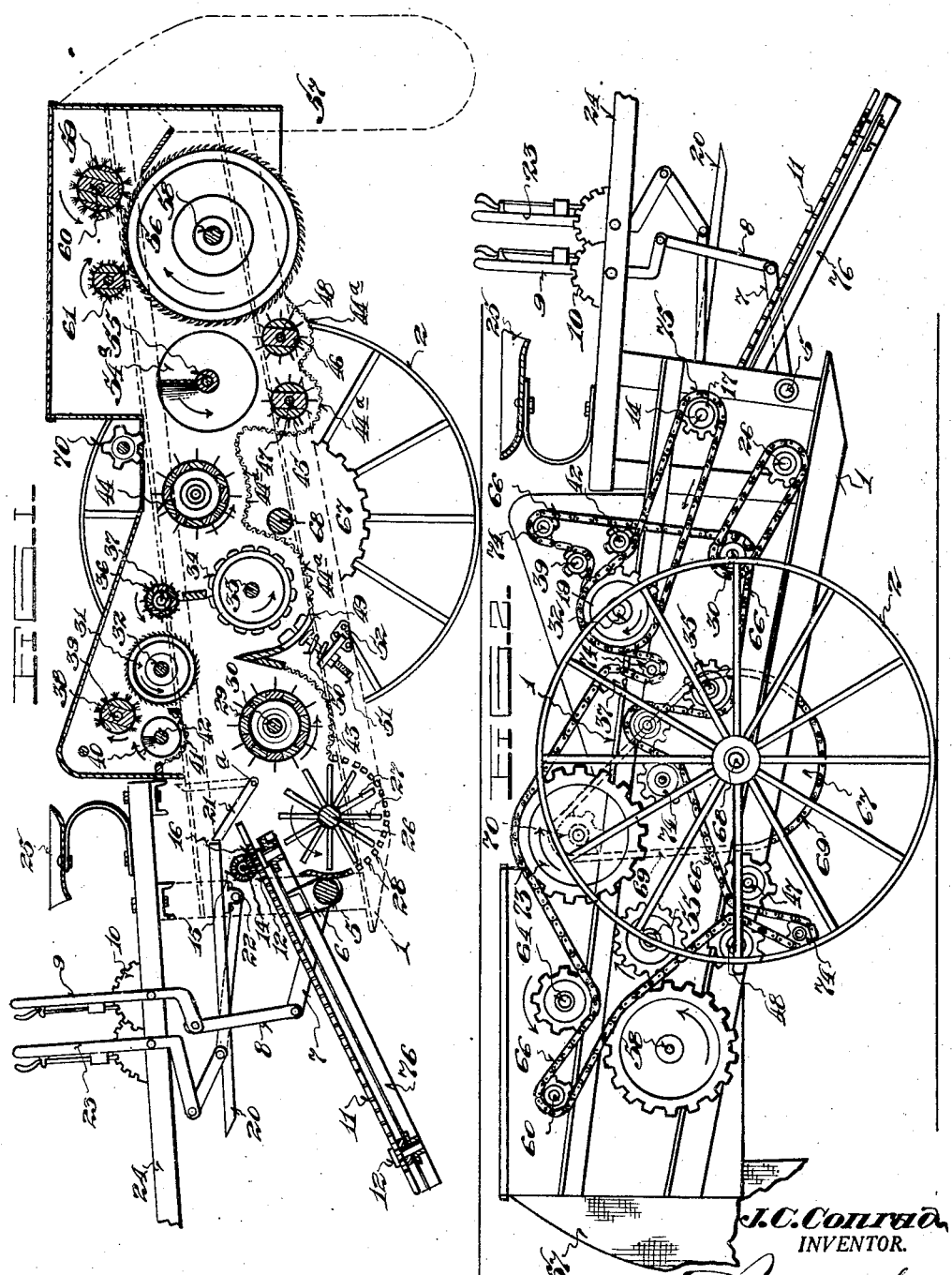

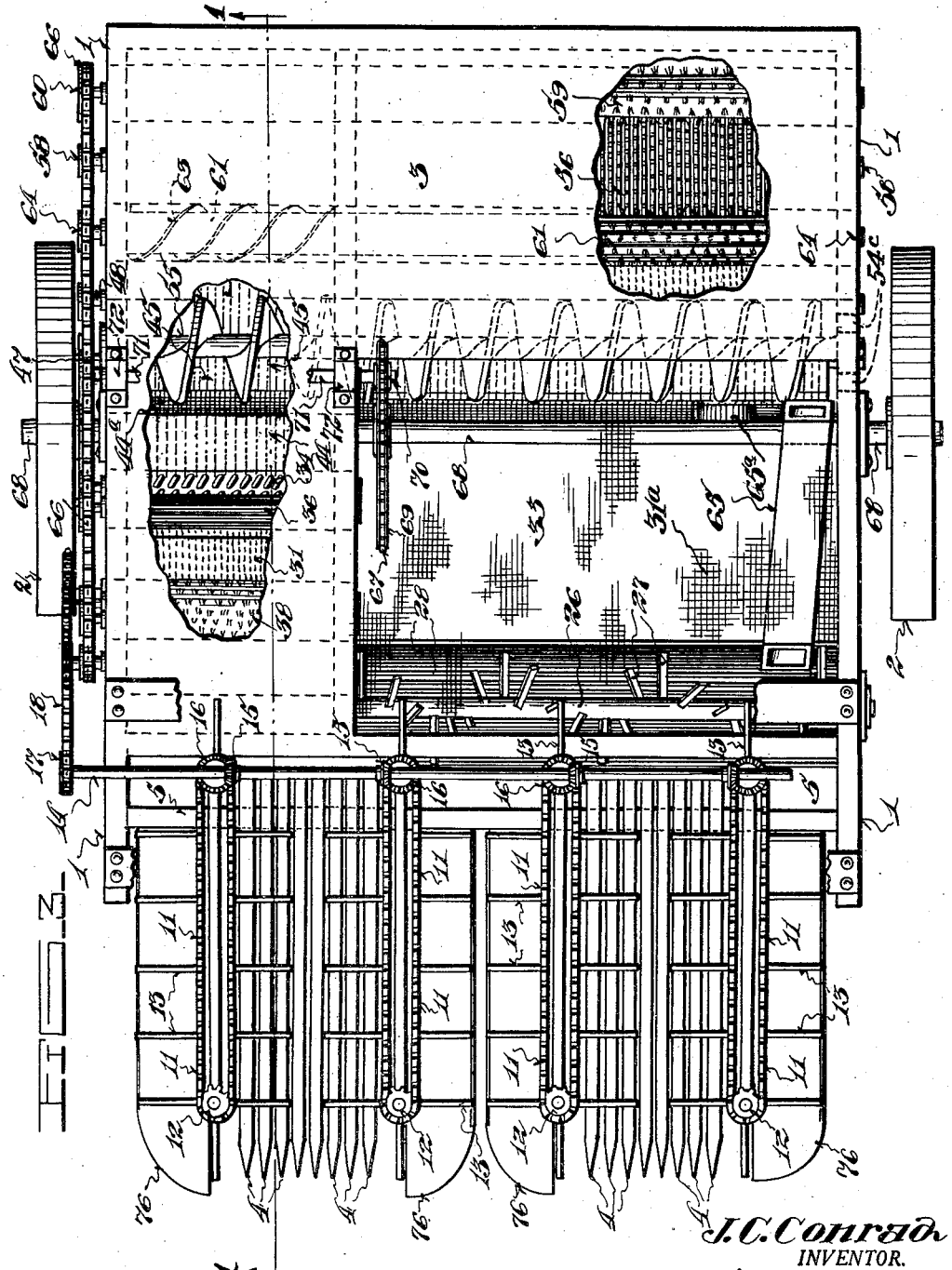

Patented Feb. 12, 1935

1,990,816

UNITED STATES PATENT OFFICE 1,990,816

COTTON HARVESTING AND CLEANING MACHINE

Joshua C. Conrad, Cement City, Okla.

Application February 28, 1929, Serial No. 343,466

7 Claims. (Cl. 19—36)

This invention relates to cotton gathering and harvesting machines and it has particular reference to cotton harvesting machines combining a series of heretofore separately operated cotton handling units functioning as cleaning and sifting devices, separators and hull extractors, and it is the principal object of the invention to provide a machine of the character specified of such construction and arrangement as to effectively gather the cotton in the field without discrimination as to unopened bolls, leaves and other foreign matter, and process the cotton during the gathering operation, in order to remove all extraneous matter therefrom to reduce the same to product, preparatory to ginning, comparatively devoid of any foreign substance likely to reduce the grade subsequent to ginning.

Another object of the invention resides in the provision of a machine designed for the purposes set forth having mechanism operating to eject the major part of extraneous matter, such as hulls, sticks, leaves and parts of stalks entering the cleaning elements of the machine with the cotton as well as means to yield to the passage through the machine of objects of such nature as to damage the various operative parts.

Yet another object of the invention resides in the provision, in a machine as specified, of mechanism of a simple nature designed to handle the material in accordance with its condition as it enters the machine in the field, that is to say, mechanism capable of segregating the matured open cotton from the immature or bolley cotton and other matter, and depositing such cotton in separate receptacles in order that the grades may be accordingly handle.

Broadly, the invention comprehends the provision of a combined cotton harvester, cleaner and separator and hull extractor to facilitate both gathering and ginning of cotton in that it increases manifold the yield of crops especially in areas wherein there is an existing labor shortage, while reducing the gathered cotton to a comparative state of cleanliness for transportation to the gin, leaving all extracted substances, likely to reduce the grade of the cotton in the field, such as hulls and stems which contain a high percent of potash, thus greatly adding to fertility of soil, since when taken to the gin this is used for fuel and is a total loss to the producer.

With the foregoing objects as paramount, the invention has further objects and advantages, which will become manifest, together with its salient features of construction and arrangement of parts, as the description proceeds, taken in connection with the accompanying drawings, wherein Figure 1 is a vertical sectional view of the invention on lines 1—1 of Figure 3.

Figure 2 is a view of the reverse side of the machine, showing the preferred form of driving means for the units, and Figure 3 is a plan view of the invention.

Figure 4 is a modified example of the cleaning and impaling mechanism of the invention, showing a continuation of the cleaning process.

Figure 5 is a detail view of the boll crushing cylinder with portions broken away.

Figure 6 is a fragmentary view of the yieldable plate carrying lugs co-acting with those of the crushing cylinder to bring about a rolling action on the bolls, and Figure 7 is a detail perspective view of one of the stripper rolls forming a part of the invention.

Since the advent of rough and indiscriminate methods of gathering cotton, such as snapping, sledding or otherwise removing it from the stalks, there has been a growing demand for machines employing these methods, yet provided with means by which they relieve the cotton of the foreign matter which inevitably enters the machine with the cotton. It is of course a well known condition, which threatens to reduce materially the standard grades of commercial lint cotton and to repel or alleviate this possibility. Machines of various kinds and types have been designed and added as an integral part of the equipment of ginneries and are effective in a measure in extracting most of the foreign matter preliminary to ginning. These machines are generally known as cleaning, sifting or extracting machines and are frequently combined to bring about a cleaning action co-incident with the introduction of the cotton into the gin.

However effective to a degree, machines of the foregoing nature are expensive additions to ginneries, and the cotton producers are required to pay higher ginning rates, which threatens to parallel their expense incurred by reason of the growing demand for higher wages of field labor. Moreover, in quantity ginning, cotton is carried through these machines with such speed and volume that only a minimum of the actual trash content is removed from the cotton and as a consequence the grade is reduced in ginning and the producer is obliged to accept prices lower than what he might receive if improved facilities were afforded and the material processed slowly as in a field machine by which superior grades of cotton, though machine picked, were produced.

The present invention therefore contemplates the provision of a medium operating in the field for gathering the cotton and reducing it to such condition for ginning that only a minimum, if any cleaning equipment will be a necessary adjunct to the equipment of ginneries, thereby not only allowing the cotton producer to realize a saving in labor in gathering the cotton, but likewise in ginning rates.

An important feature also of the present invention resides in the provision of means to remove and dispense with the top foliage of the stalk which usually bears no cotton, and also with all immature bolls and other substance which is left in the field, without passing through the cleaning mechanism but is collected and deposited on the ground.

Accordingly, reference is made to the drawings wherein 1 designates a frame structure comprised preferably of channel iron and mounted upon wheels 2, and housing the mechanism to be later described is a housing 3 of any suitable construction. The machine is capable of being drawn along the rows of cotton by draft animals or by motor power, but in the present case and in view of the apparent lightness of the structure, the machine is shown as being horse drawn.

While there is no limitation intended the present machine has been designed to handle two rows of cotton, it being understood that as many rows may be covered as is considered practicable. In the present case, the stripping mechanism, shown especially in Figure 3, is comprised of two sets of fingers 4, each comprising a multiplicity of such fingers arranged in parallel relationship, and at an angle with respect to the front of the machine in order that their pointed ends will be in such position as to engage the stalks of cotton in succession at a point below the foliage. These strippers however are adjustable, by reason of the fact that a lateral shaft 5 is provided upon which the stripper frame work is pivotally mounted at 6, in Figure 1. A link 7 is affixed to this shaft, which extends and is pivotally joined to a similar link 8, the latter in turn being pivotally connected to the lower end of the operating lever 9 movable over a conventional quadrant 10.

An important and novel feature of the invention resides in the provision of conveyors operating over each of the stripper elements and which are comprised of chains 11, traveling about sprockets 12, at both upper and lower ends of the stripper elements. Affixed to and laterally extending from the chains 11 are short fingers 13, better shown in the plan view Figure 3. Obviously, as the chains operate about the sprockets 12, the fingers 13 function to convey the material released from the stalks by the stripping elements upwardly, whereupon it enters the machine for processing in the manner to be later explained.

The driving means for these conveyors is, in the present case, a shaft 14, carrying a series of relatively spaced beveled gears 15, co-operating with similar gears 16 mounted upon the stub shafts carrying the upper sprockets 12 of the stripper elements. This shaft 14 is fixed to move with the stripper elements as they are adjusted by the operating lever 9, in order that their motion will not be interrupted during such adjustment. The shaft 14 has upon one end a sprocket 17, shown in Figures 2 and 3, over which operates a short link chain 18, from a similar sprocket 19, upon the end of one of the elements interiorly of the machine and to which reference will be later made as the description proceeds.

It is very clear from the foregoing that the stripping elements are effective to a maximum degree in removing from the stalks all opened or unopened cotton such as immature bolls and the like, which, through the use of any other methods of gathering, will be a total loss. These bolls are kept from falling from the stripping elements by the continuous movement of the conveyors thereover. However, it has been found that in some sections of the cotton regions, the stalks attain great height but seldom is it found that the top foliage bears fruit, but this foliage, if not dispensed with will enter and interfere with the effectiveness of the cleaning elements. In order to meet these conditions, a top stripper 20, not shown in Figure 3, is provided over each of the stripping elements just described, of such height as to strip off the unproductive foliage of the plant and dispense with it by passing it down the incline 21, shown in Figure 1 in operative and inoperative positions. The incline is moved to this latter position in cases where it is seen that the extraordinarily tall stalks are bearing sufficient bolls as to justify the passage of the material into the machine along with that gathered by the stripping elements below. Inoperative position of the incline 21 is shown in dotted lines in Figure 1 and pivoted at $a$. When the machine is operating to gather dwarf cotton, or cotton having a poor stand, the chute 21 is moved to the inoperative position shown in dotted lines in Figure 1, but when the machine is used to harvest cotton having a superfluity of foliage, it is desirable that the major part of this foliage, which is usually devoid of cotton, be discharged out of the machine. Therefore, when the chute 21 is disposed in the position shown in solid lines in Figure 1, excess foliage stripped by the stripping element 20 is carried over the primary cleaning element at the front of the machine and discharged into the open area 33. Thus the cotton gathered by the main stripping elements, as it passes through the machine, will not be interfered with by an excess of leaves, trash and other foreign matter.

The auxiliary or top stripper 20 is likewise adjustable upon its shaft 22, through lever 23, in a similar manner as carried out in the adjustment of the main stripping elements. Each of the operating levers 9 and 23 are mounted upon the tongue 24 of the machine, which also supports the driver's seat 25.

Having comprehensively set forth the manner in which the cotton is gathered and deposited into the machine, particular reference will be hereinafter made to the units combined to impart to the material so entering the machine the initial or primary cleaning action, to remove large trash, such as parts of stalks, leaves and other such substance to facilitate the cleaning of the cotton, and reference to all other units in the order in which they operate to process the cotton to the final cleaned state.

Primarily, the material, which is in great part trash, is deposited by the stripper conveyors into what will be hereinafter termed and referred to as the primary cleaning unit, and which is comprised of a shaft 26, or conveyor from which extend a multiplicity of beater arms 27, so disposed on the shaft that the material will have a tendency to move toward one end, in the manner of a conveyor. This unit is surrounded by a multiplicity of parallel bars 28, forming a cage, and the greater part of the trash, such as parts of bolls, sticks, limbs and leaves, are forced through the openings between the bars onto the ground by the fast revolving beater arms 27, and since the openings are not of such width as to admit unopened or partially unopened bolls, locks of cotton and the like, this matter is thrown upward at the discharge side of the primary cleaning unit, to be received by a rapidly revolving spiked beater drum 29, mounted upon a shaft 30, which revolves in the same direction as the primary cleaning units, and thus discharges the material upwardly into close proximity to an impaling drum 31, comprising a cylinder having a covering of card clothing or its equivalent. This impaling drum is mounted upon a shaft 32 and rotates in the same direction as the primary cleaning unit and adjacent spiked drum 29. Material impaled upon and discharged from the impaling drum 31 is received within a canvas receptable 31a, fragmentarily shown in Figure 3 as being swung in the open area 33.

The material after having been subjected to the action of the primary cleaning unit, still contains a good percentage of small trash, but it is usually the case that a great amount of comparatively clean cotton, that is to say, cotton which has attained maturity and is ready for picking, is taken by the stripping elements, and which cotton, if permitted to pass through the machine with the other cotton having trash content, would be reduced in grade by becoming mixed with the immature cotton. It is therefore intended that this mature cotton shall be removed from the common bulk and deposited into a separate receptacle in the form of a canvas sack or the like, 31a swung in the open area 33, of the machine frame, shown in Figure 3.

In order to accomplish the foregoing, the spiked drum 29, in discharging, throws the bulk of the incoming material against the impaling drum, and exposed, mature cotton will have a tendency to adhere to the drum, while the cotton encumbered with trash either falls by gravity back into the operative area of a crushing cylinder 34, mounted on shaft 35, or is brushed back by a stripper roll 36, mounted upon a shaft 37, adjacent the impaling drum 31. It is obvious therefore, that the cotton which is comparatively free of hulls, trash or the like is carried around the impaling drum 31 and doffed from the teeth of the drum by the doffer brush 38, mounted upon shaft 39, see Figure 1. A conveyor 40, having thereunder a screen 41 receives the cotton doffed from the impaling drum 31, and carries it to the receptacle swung in the unoccupied area 33, above referred to, where it is retained. The conveyor 40 is of continuous flight type and is mounted upon shaft 42. It will also be noted in Figure 1 that the spiked drum 29 and crushing cylinder 34 as well as the conveyor 40 each have foraminous surfaces 43 and 44a respectively over which they operate to facilitate the cleaning action on the cotton.

It should be borne in mind that the operation described in the foregoing is an important feature of the invention and it is particularly pointed out that gravity greatly assists in making the separation. The hulls, trash, leaves and the like, being heavier than the cotton, naturally tend to fall out of the cotton impaled on the teeth of the impaling drum, and with this fact, together with the action of the stripper roll 36, the cotton is rendered comparatively clean of trash.

It will be noted in Figure 3 that the primary units of the invention, consisting of the impaling drum 31, doffer brush 38, stripper roll 36, boll crushing cylinder 34, spiked drum 29 and a similar spiked drum 44 on the opposite side of the crushing cylinder, are all on one side of the machine, that is they do not operate the full width of the machine. However, the primary cleaning unit, functioning as a conveyor, does operate the full width of the machine and discharges at the right of the operator, from whence the material travels through the units in the order hereinafter described.

The spiked drum 44, briefly referred to in the foregoing, receives the discharge from the crushing cylinder 34 to convey the material into the cleaning assembly, comprised of beater drums 45 and 46, mounted on shafts 47 and 48 respectively. The formanious surface 44a, over which these beaters operate is merely a continuation of the screen against which the crushing cylinder 34 and spiked drum 44 operate. However, it will be noted in Figure 1 that only a part of the operative circumference of the crushing cylinder 34 is covered by the screen, the remaining part being covered by a device arranged to yield to an object passing through the machine of such nature as to likely cause damage to the various units. This device consists of a plate 49, as exemplified fragmentarily in Figure 6, held in yielding relationship with the operative area of the crushing cylinder by a spring 50, surrounding a rod 51, the latter being capable of sliding movement through a support 52, fixed to the side of the frame 1 of the machine. It is obvious that any object of such size and nature as to cause damage to the mechanism will yield to the action of the crushing cylinder 34. This is a feature of particular importance in a machine of this character combining harvesting machinery with cotton cleaning equipment, especially in view of the fact that in rough gathered cotton, a considerable quantity of unopened bolls and the like enter with the cotton, which must be broken in order that the cotton may be impaled and withdrawn.

In the conventional and well known cleaning equipment, designed primarily to meet the conditions brought about by the advent of machinery harvesting, there is a great demand for crushing rolls and equipment which will release the hulls and burrs from the cotton without disintegrating them and mixing the resulting small fragments with the cotton and thereby reducing the grade thereof. These fragments are non-siftable usually and are therefore difficult to remove by ordinary cleaning machinery and attempts to extract them by violent methods still further reduce the value of the cotton by breaking the fibers.

It is therefore important to observe that the crushing cylinder 34, shown in Figure 5 is provided with lugs 53, staggeringly disposed in angular relationship, which co-act with similar lugs 54, carried by the plate 49, which latter lugs, as apparent in Figure 6, are arranged at reverse angles with respect to the lugs carried by the cylinder. Such relationship of the lugs brings about a rolling action on the bolls, rather than a disintegrating action, not unlike rolling a boll of cotton between the hands. The hulls are thus parted and detached from the cotton without shattering them and causing the fine trash to become entangled in the locks of cotton, allowing the trash and dirt to pass through the bottom screen 44a while the hulls and seed cotton are discharged into conveyor 54a, operating above the cleaning cylinders 45 and 46 on shafts 47 and 48 and carried thereby along the face of the toothed drum 56 to the discharge opening 54c at the opposite end of the conveyor 54a. During the travel of the hulls and seed cotton along the face of the drum 56, the stripper roller 61 knocks the hulls with locks of cotton attached, at a tangent over the conveyor 54a across the width of the area in which the conveyor operates and when the boll containing a lock of cotton arrives at or near the discharge end of the conveyor, it flies into the chute 65 to be returned to the front of the machine for recleaning. This does not apply to clean cotton or clean hulls. Clean hulls will not adhere to the teeth of drum 56 but will pass on out of the end of the conveyor 54a. Cotton free of hulls will adhere to the teeth of drum 56 and will be unaffected by the stripper roll 61 and hence will be doffed by the doffer roll 59 into the receptacle 57. Fine particles of dirt and pin trash are discharged onto the ground through the screen 44a. The cleaner rollers 45 and 46 keep the mass of cotton and hulls in agitation and continuously move the same against the toothed drum 56 which impales the cotton on its teeth. The rollers 45 and 46 being disposed immediately below the conveyor 54a provide virtually a moving bottom or trough for the conveyor and since they revolve in the same direction as the large impaling drum 56, the mass is in continuous engagement with this drum or is being moved into engagement many times during its progressive movement along the face of the drum by the conveyor 54a.

The cotton and hulls are passed along the cleaning units 45 and 46 hereinbefore mentioned, which relieves the cotton of more of its trash content and conveys it into the operative area of the large impaling drum 56, the latter withdrawing the cotton and discharging it into a suitable receptacle 57, swung from the rear of the machine frame. This drum is mounted upon shaft 58, and a doffing brush 59, carried upon shaft 60 operates to doff the cotton carried around on the teeth of the cylinder into the receptacle 57. However, as the cotton impaled upon the cylinder 56 passes upward, it is subjected to the action of the stripper roll 61, whose peculiar construction is shown in Figure 7 particularly, its function being to strip off all clinging hull fragments and other trash into the conveyor 54a to be carried out of the machine in the manner to be hereinafter explained.

The stripper roll 61, in some respects is not unlike the conventional stripper, but in this particular case, a brushing action is likewise imparted to the cotton by the provision of longitudinally spaced tufts of bristles 62 between stripper blades 63 as shown in Figure 7. This stripper roll is mounted upon shaft 64, and as apparent in Figure 3, the plan view, the impaling drum 56, which will be likewise designated as the discharge drum, to distinguish it from the drum 31, also an impaling drum, is disposed the full width of the machine, as is the doffing brush 59, stripper roll 61, and elements 54a, 45 and 46. The flights, as well as the brushes carried by the stripper roll 61, near the receiving end are of spiral form as in Figure 7, so as to deflect the foreign matter away from the material entering by way of the cleaning assembly, or in a direction toward the opposite side of the machine, as shown in Figure 3. This type of conveyor has been found to be practicable, but the machine is not necessarily limited to its use.

The conveyor 54a receives hulls from the cotton as well as those having clinging locks of cotton stripped from the impaling drum 56 by the stripper roll 61 as the mass is advanced along the face of the drum by the conveyor. This action is repeated until the hulls having clinging locks of cotton finally arrive at the discharge end of the conveyor 54a. The hulls are discharged by the rapidly rotating stripper roll 61 in a tangent line and impinge the vertical wall of the machine immediately in front of and above the conveyor 54a, as in Figure 1 of the drawings. As the hulls having clinging locks of cotton are advanced with the mass toward the discharge end of the conveyor 54a, they are continuously thrown by the stripper roll 61 into the open end of the chute 65, which is above the axis of the conveyor 54a and has its discharge end lying in the trough of the conveyor 26 or primary cleaning unit near the front of the machine (see Figure 1).

The drum 44 feeds the mass of cotton, hulls and trash to drums 45 and 46, also to the conveyor 54a for the separation of the cotton from the hulls and trash. Four separations are made; one, seed cotton by the impaling drum 56; one of hulls at the discharge end of the conveyor 54a out of the machine; one of hulls and locks of clinging cotton thrown by stripper roller 61 tangentially into the chute 65 just prior to the discharge of the hulls by the conveyor 54a and the separation of fine trash through the screen 44a below the moving parts.

Adjacent the mouth of the chute 65 is arranged a deflector 65a, so disposed at an angle relative to the movement of the material as imparted thereto by the conveyor 54a, as to retard progressive movement of the material, throwing it again and again into the operative area of the flights, in order to aid in ridding the remaining cotton in transit through the machine for a recleaning process, of its trash content. A series of these deflectors may be employed in spaced relationship along the full length of the conveyor screen.

Another feature of importance to the successful operation of a machine of this character and not heretofore employed as an element in a cotton harvesting machine, is the separation of the grades as previously mentioned, that is to say, retrieving the lock cotton of a superior grade and depositing it into a separate receptacle before the sample is reduced by mixing it in cleaning with the bolley cotton, i. e., cotton which has not reached maturity and is in a hard and discolored condition. This operation, as previously set forth is primarily carried out by the impaling drum 31 and associated elements subsequent to the operation of the primary cleaning unit at the front of the machine, which removes sticks, leaves and other matter which likewise reduces the grade.

Referring now especially to the driving means for the various cylinders and rolls, it is noted in Figure 2 that a continuous chain 66 is arranged about the several sprockets fixed to the protruding ends of the shafts upon which the units are mounted. The main drive is obtained from a large sprocket 67, mounted upon the axle 68, within the unoccupied area 33, about which a chain 69 is passed and which latter surrounds a smaller sprocket 70, mounted upon a short shaft 71 atop the machine frame and supported in bearings 72. A large sprocket 73 is carried upon the opposite or outside end of this shaft, and the main drive chain 66 passes over this sprocket, which is rotated in a clockwise direction, causing the several sprockets, disposed upon the shafts, characterized for identification with the particular unit carried thereby to move in the direction of the arrows, to effect co-operation of the units in carrying out the gathering and cleaning process for which the machine was designed as described. To obtain proper direction of rotation of the several cleaning units, there has been incorporated a number of idle sprockets, and for clarity in denoting the operation of the main drive chain 66, these sprockets are generally indicated by the common reference character 74 in Figure 2.

In order to obtain the proper direction of travel for the conveyor chain 11, operating on the stripper elements, the separate chain 18 has been provided, which surrounds sprockets mounted upon the protruding ends of shafts 14 and 32, carrying respectively bevel gears 15 and the impaling drum 31. This drive causes the shaft 14 to move in a clockwise direction, when viewed in the position shown in Figure 2, causing the gears 15 in co-acting with gears 16 to move the conveyor chain 11 so that the fingers 13 carried thereby will move upward on the inside of the opposing finger assemblies, over the aprons 76, as shown in Figure 3.

It is not considered necessary to describe the operation of the machine in practice, since the foregoing description has been set out in such manner as to clearly define the construction and function of each unit contained in the assembly, and its relationship with the companion units, and with this in view, reference is made to Figure 4 of the drawings, wherein is shown diagrammatically a modified form and arrangement of units, whereby to obtain the maximum of effect produced by the machine by a continuation of the impaling operation to extract hulls and other matter from the cotton.

The arrangement shown in Figure 4 is comprised of a series of impaling drums 77, capable of a function similar to that of the impaling drum 31 shown in Figure 1, and beneath these drums is situated a series of beater cylinders 78, operating over a foraminous surface 79. Adjacent each of the impaling drums 77 is a stripper roll 90, each being so arranged that it will function as a feeder roll for one of the drums, while stripping hulls and the like from the cotton impaled by the opposing drum. A large stripper roll 81 is situated near the inlet 82 of the assembly.

It will be noted that only two doffing brushes 83 are required for the assembly, to remove cotton from the teeth of the drums. These brushes are so situated as to doff the impaled cotton into separate conduits, that is to say, a conduit 84 is arranged to receive cotton from the upper brush 83, while a partition 85 divides the outlet conduit in order to define a smaller area 86 to receive cotton doffed by the last impaling drum by the lower brush 83. Hulls and other trash are thrown from one to the other of the spiked beater drums 78, to the outlet 87 from whence it is discharged. The pin trash and other small particles of foreign matter, of course pass through the screen 79.

Cotton entering at 82 is caught up by the first beater 78 and is thrown upward into the operative area of the first impaling drum 77, whereupon that portion of the material comparatively free of burrs, and unopened bolls will be caught upon the teeth of the drum and carried upward to be doffed into the discharge conduit 84. That portion however which falls again into the cleaning units is carried to the next drum and subjected to the action thereof in a manner similar to the action imparted by the first unit. This operation continues until the material reaches the outlet end of the cleaning assembly comparatively clean of any cotton.

Manifestly, the construction shown and described is capable of considerable modification, and it should be understood that every good and useful purpose to which the invention may be put is considered to be well within the category of its objects.

What is claimed is:—

1. In a cotton harvesting and cleaning machine, a cleaning assembly comprising a series of foraminous concaves and co-operating beater cylinders, a crushing cylinder in advance of beater and concave assembly, means in advance of said crushing cylinder to receive material and impart thereto an initial cleaning operation, means adjacent the discharge of said receiving means to impale portions of said material in its passage to said crushing cylinder and cleaning assembly, a doffing means for said impaling means, a toothed cylinder rotatably disposed adjacent the discharge end of said cleaning assembly to receive and discharge cleaned material from said machine and separate means to contain the cotton discharged by said impaling means and said toothed cylinder.

2. In a cotton harvester and cleaning machine, cleaning mechanism including rotatable means for receiving and imparting to the material an initial cleaning operation, a cleaning assembly apart from said latter means for subjecting the material to a series of semi-rotary movements over a foraminous surface, a boll crushing cylinder in advance of said cleaning assembly, an impaling means adjacent said boll crushing cylinder for intercepting relatively clean material in transit from said initial cleaning means to said crushing cylinder, means adjacent the discharge area of said cleaning assembly for withdrawing cleaned material therefrom and separate means for retaining material doffed from said impaling means and said latter means.

3. In a cotton harvesting and cleaning machine, a cleaning assembly comprising, a series of cleaning units operating to advance cotton through the machine during the cleaning operation thereof, means in advance of said cleaning assembly for receiving and imparting to the cotton an initial cleaning operation, means for impaling and withdrawing relatively clean material in transit from said initial cleaning means to said cleaning assembly, means for transporting uncleaned cotton to a point for return passage through said cleaning units, means in the path of said cotton for crushing unopened bolls of cotton for subjection to the action of said cleaning units, and means for receiving cleaned cotton from said machine at two points of discharge.

4. In a cotton harvesting and cleaning machine, a cleaning assembly comprising a series of cleaning units operating to advance the cotton through the machine during the cleaning operation thereof, means in advance of said cleaning assembly for receiving and imparting to the cotton an initial cleaning operation, means for impaling and withdrawing relatively clean material in transit from said initial cleaning means to said cleaning assembly, means in the path of said cotton for crushing unopened bolls of cotton for subjection to the action of said cleaning units, means adjacent the discharge area of said cleaning assembly to discharge cotton from said machine and means for ejecting uncleaned cotton from said discharge for re-passage through said machine.

5. In a cotton harvester and cleaner, a cleaning assembly including primary rotary receiving means arranged to impart an initial cleaning operation to the cotton, a crushing cylinder and a series of adjacent cleaning units, an impaling cylinder and doffing means arranged to remove and discharge relatively clean cotton in transit to said crushing cylinder, means for intercepting uncleaned cotton at the discharge end of said cleaning assembly for return passage through said machine, and separate means for receiving and retaining cleaned cotton discharged from said cleaning assembly and said impaling cylinder.

6. In a cotton harvester and cleaner, a series of cleaning units, a boll crushing cylinder in advance thereof, means for primarily ejecting major trash entering with the cotton, means intercepting the relatively clean cotton in transit from said trash ejecting means to said breaker cylinder, separate means for receiving and retaining the cotton discharged from said cleaning units and said intercepting means, means operating in the discharge area of said cleaning units to withhold cotton having trash content and means for returning said latter cotton to said primary trash ejecting means for re-processing through said machine.

7. In a cotton harvester and cleaner, a series of cleaning units, a boll crushing cylinder in advance thereof, means for primarily ejecting major trash entering with the cotton, means intercepting the relatively clean cotton in transit from said trash ejecting means to said breaker cylinder, means for receiving said cotton upon its discharge from said machine, means for processing the remaining cotton in said machine for cleaning, said means comprising a conveyor and a chute for returning uncleaned cotton to said primary trash ejecting means and means for receiving and retaining said latter cotton upon its discharge from said machine.

JOSHUA C. CONRAD.